| United States Patent [19] | [11] Patent Number: 4,950,506 |
| Halloran et al. | [45] Date of Patent: Aug. 21, 1990 |

[54] WATER SHEETING ZWITTERIONOMERIC AMINOFUNCTIONAL SILOXANES

[75] Inventors: Daniel J. Halloran, Midland; Kenneth A. Kasprzak, Saginaw Township, both of Mich.; Stefano G. Savastano, Somerset, N.J.; Terence J. Swihart, Essexville, Mich.

[73] Assignee: Dow Corning Corporation, Midland, Mich.

[21] Appl. No.: 460,708

[22] Filed: Jan. 4, 1990

Related U.S. Application Data

[62] Division of Ser. No. 293,842, Jan. 5, 1989, Pat. No. 4,898,614.

[51] Int. Cl.$^5$ .............................. B05D 3/02; B32B 9/04
[52] U.S. Cl. ...................................... 427/387; 428/447
[58] Field of Search .......................... 427/387; 428/447; 106/3, 8; 556/413, 419, 420, 421, 423, 424

[56] References Cited

U.S. PATENT DOCUMENTS

| 3,576,779 | 4/1971 | Holdstock et al. ............... 106/3 X |
| 4,507,455 | 3/1985 | Tangney et al. ............... 556/419 X |
| 4,609,750 | 9/1986 | Kollmeier et al. ............... 556/419 |

*Primary Examiner*—Michael Lusignan
*Attorney, Agent, or Firm*—Jim L. DeCesare

[57] ABSTRACT

A polish formulation containing as components at least one member selected from the group consisting of waxes, solvents, surfactants, thickening agents, abrasives, dyes, odorants, and other ingredients normally used in making polishes, and as an improvement incorporating a composition which is the reaction product of an acid anhydride and an aminofunction siloxane. The resulting zwitterionic aminofunctional siloxane can, if desired, be further reacted with a strong acid to provide an equilibrium of the zwitterion and a conjugate acid base pair of the zwitterion and the acid. The invention also includes a method of sheeting water on a surface with the polish, a method of making an aminofunctional siloxane zwitterionomer, and an aminofunctional zwitterionomeric siloxane compound which is the reaction product.

9 Claims, No Drawings

WATER SHEETING ZWITTERIONOMERIC AMINOFUNCTIONAL SILOXANES

This is a divisional of co-pending application Ser. No. 07/293,842 filed on Jan. 5, 1989, now U.S. Pat. No. 4,898,614, patented Feb. 6, 1990.

BACKGROUND OF THE INVENTION

This invention relates to a polish formulation including a zwitterionic aminofunctional siloxane which imparts to the surface containing the polish a film forming capacity which functions to sheet water coming into contact with the surface rather than to bead the water as has been the case with prior formulations.

Polishes are used to produce a glossy finish on a surface as well as to prolong the useful life of the surface. The gloss provided by the polish is the result of components in the polish which leave a coating and that function to smooth and clean the surface. Floor polish, furniture polish, and shoe polish, rely upon a deposited film. Car and boat polish formulations result in a glossy and protective film and contain abrasives for removing weathered paint and soil as well as old built-up polish. Metal polish contains ingredients for abrasive smoothing of the surface being treated and for surface cleaning, as well as component that function to remove and retard the build-up of tarnish.

Motor vehicle polish is formulated in order to remove road film and oxidized paint, and to provide a continuous glossy film which resists water and its removal by water and car wash detergents. Such vehicle polishes contain several major functional ingredients including an abrasive. The abrasive, however, must be mild enough to avoid scratching of the painted surface, and representative of such mild acting materials are, for example, fine grades of aluminum silicate, diatomaceous earth, and various silicas. Straight and branched chain aliphatic hydrocarbons are employed to facilitate the detergency of the polish against oil based traffic soils and debris, and in provide the solvency characteristics necessary in the production of a stable formulation. These hydrocarbons also control the drying rate of the formulation. Wax constitutes another polish ingredient and is one of the two film forming materials in the polish. The wax is spread and leveled and produces a high luster following buffing of the surface. Blends of soft and hard wax are often employed in order to facilitate ease of buffing and the durability of the polish against environmental antagonists. Exemplary waxes are paraffin wax, microcrystalline petroleum wax, carnauba wax, candella vegetable wax, montan coal derived was, and synthetic polymeric waxes such as oxidized polyethylene.

Silicone materials are included in polishes as the other film forming ingredient. Such silicone materials also function as lubricants for easing the application of the polish as well as its buffing, and act as release agents for dried abrasive. The silicone materials spread easily and provide a uniform high gloss and with it water repellency. Such materials typically are dimethylsilicones, however, aminofunctional silicone products are becoming more prevalent. The aminofunctional products result in films having increased resistance to removal from the surface by detergents and the environment believed to be the result of their ability to plate out on a painted surface and to crosslink and bond to that surface.

A car polish may also contain an emulsifier, a thickener, and a stabilizer, for the production of a homogeneous stable product of desired consistency. Such polishes may be solid in form, semisolid, presoftened, or liquid. The polish, for example, can be solvent based or an emulsion, and in either case is a liquid, semi-solid or solid in construction. Typically, liquid emulsions include ten to fifteen weight percent of an abrasive, ten to thirty weight percent of solvent, two to fifteen weight percent of a silicone material, and up to about four weight percent wax. In an emulsion paste formulation, the wax ingredient is increased in level from three to twenty-five weight percent.

In U.S. Pat. No. 3,956,353, issued May 11, 1976, there is disclosed the reaction product of an aminofunctional silane and a cyclic acid anhydride. These products are limited, however, to vinyl benzyl functional amines whereas the materials of the present invention differ in the amine group, and do not require such a substitution. Such products further are not disclosed to be useable in a polish formulation as such, but are aqueous or alcohol coupling agent compositions, in contrast to the polish composition disclosed in the present invention. Polishes, it should be noted, require polymers with significant dimethyl character for solubility, as are the aminofunctional siloxane zwitterions of the present invention. The reaction products in U.S. Pat. No. 3,956,353, however, are low molecular weight monomer materials. Polish formulations containing silicone materials are disclosed in U.S. Pat. No. 3,508,933, issued Apr. 28, 1970, in U.S. Pat. No. 3,836,371, issued Sept. 17, 1974, and in U.S. Pat. No. 3,890,271, issued June 17, 1975. While these silicone materials are characterized as being aminofunctional siloxanes, they are not zwitterionomers as are the compositions of the present invention, and it is not believed to be known to employ zwitterionomers in polish formulations. What appears to be a zwitterion in a polish in Japanese Publication No. 8029/80 is actually an amido acid. Such acids are low molecular weight hard solids in contrast to the high molecular weight fluids of the present invention. Further, the function of such amido acids is to increase the luster or shine of a polish, rather than to cause water to sheet as in the present invention. Zwitterionomers are not new as exemplified by U.S. Pat. No. 4,525,567, issued June 25, 1985, to Campbell et al, however, the zwitterionomers of Campbell et al. are characterized as being sultone based zwitterionomers whereas the zwitterionomers of the present invention are sulfur free amine cyclic-anhydride based zwitterionomers in contrast thereto. Further, the zwitterionomers of the present invention are lactone free in contrast to Campbell et al. A further distinction exists between the instant invention and that of Campbell et al, in that in Campbell et al, there is disclosed a low cost process of making the zwitterions by combining OH endblocked polydimethylsiloxane, a functional silane, and an acid catalyst. In the present invention, however, the zwitterionomers can be prepared from fully-premade aminofunctional siloxane polymers which are not silicon functional. As such, the compositions of the present invention provide new and unique advantages over typical prior art polish formulations which will become apparent hereinafter.

SUMMARY OF THE INVENTION

This invention relates to a polish formulation containing as components thereof at least one member selected from the group consisting of waxes, solvents, surfactants, thickening agents, abrasives, dyes, odorants, and other ingredients normally used in making polishes. The improvement includes incorporating therein a composition which is the reaction product of a cyclic acid anhydride and an aminofunctional siloxane selected from the group consisting of (A) a blend or reaction product of a hydroxyl endblocked polydimethylsiloxane having a viscosity in the range of about 10 to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms, (B) a blend or reaction product of a hydroxyl endblocked polydimethylsiloxane having a viscosity in the range of about 10 to 15,000 cs at twenty-five degrees centigrade, a silane selected from the group consisting of those having the general formula $(R_1O)_3-SiR_2NHR_3$ and $(R_1O)_3-SiR_2NHCH_2CH_2NH_2$ wherein $R_1$ is an alkyl radical containing from one to four carbon atoms, $R_2$ is a divalent hydrocarbon radical free of aliphatic unsaturation and contains from three to four carbon atoms, and $R_3$ is selected from the group consisting of the hydrogen atom and the methyl radical, and a silane having the general formula $X_3SiZ$ wherein X is selected from the group consisting of alkoxy and acyloxy radicals containing from one to four carbon atoms, and Z is nonhydrolyzable radical selected from the group consisting of hydrocarbon radicals, halogenated hydrocarbon radicals, and radicals composed of carbon, hydrogen, and oxygen atoms, wherein the oxygen atoms are present in hydroxyl groups, ester groups, or ether linkages, there being from one to ten carbon atoms in the Z radical, and (C) a blend or reaction product of a polydimethylsiloxane having a viscosity in the range of about one to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms. (C) above is a specific species and a trimethylsilyl endblocked aminofunctional siloxane produced by incorporating conventional trimethylsilyl functional silanes or siloxanes into the aminofunctional siloxanes.

In a specific embodiment of the present invention, the acid anhydride is selected from the group consisting of succinic anhydride, maleic anhydride, phthalic anhydride, and carbon dioxide. The reaction product is an aminofunctional siloxane zwitterion having the structural formula:

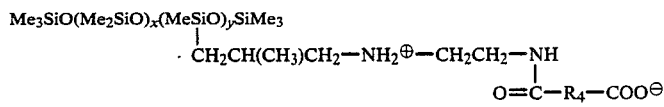

where Me is methyl, x is an integer of from about forty to about four hundred, y is an integer of from about one to about twenty, and $R_4$ is ethylene, vinylidene, or phenylene. x is preferably 188 and y is ten.

The zwitterionic aminofunctional siloxane can, if desired, be further reacted with a strong acid resulting in an equilibrium of the zwitterion and a conjugate acid base pair of the zwitterion and the acid; for which the extent of conjugate acid base pair formation depends upon the pKa of the strong acid and the dielectric strength of the solvent. In such case, the strong acid is selected from the group consisting of hydrochloric, hydrobromic, hydriodic, nitric, perchloric, phosphoric, and organic acids. The organic acid is selected from the group consisting of acetic, propionic, butyric, valeric, caproic, benzoic, halo-substituted benzoic, and nitro-substituted benzoic. The conjugate acid base pair of the zwitterion and the strong acid has the structural formula:

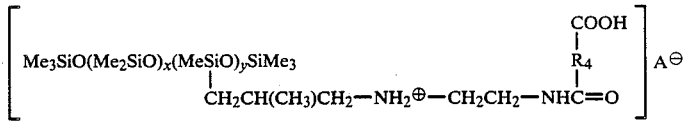

where Me is methyl, x is an integer of from about forty to about four hundred, y is an integer of from about one to about twenty, A is an anion and the conjugate base of the strong acid, and $R_4$ is ethylene, vinylidene, or phenylene. x again is preferably 188 and y is ten.

The invention is further directed to a method of sheeting water on a surface in which there is applied to the surface before the surface is exposed to water a polish formulation containing as components thereof the ingredients enumerated above.

The invention is also directed to a method of making an aminofunctional siloxane zwitterionomer comprising reacting an acid anhydride with an aminofunctional siloxane selected from the group consisting of (A) and (B) as set forth and detailed above.

Still further, the present invention relates to an aminofunctional zwitterionomeric siloxane compound which is a reaction product of an acid anhydride with an aminofunctional siloxane selected from the group consisting of (A) and (B) again as defined hereinabove.

It is therefore an object of the present invention to provide a new and novel type of polish formulation particularly adapted for use on motor vehicles in which water coming into contact with such surfaces is sheeted and drained away rather then being beaded and repelled as has been the practice of prior art formulations in the past. A particular advantage to this approach is that vehicles need not be washed following every period of rain as has been the case due to spots caused by the beads. Instead, with the sheeting action of the compositions of the present invention, this disadvantage is overcome, and rain is sheeted away from vehicle surfaces without leaving behind the unaesthetic appearance of rings containing debris.

These and other features, objects, and advantages, of the herein described instant invention, should become more apparent when taken in conjunction with the following detailed description thereof.

DETAILED DESCRIPTION OF THE INVENTION

A surfactant is a compound that reduces surface tension when dissolved in a liquid. Surfactants exhibit combinations of cleaning, detergency, foaming, wetting, emulsifying, solubilizing, and dispersing properties. They are classified depending upon the charge of the surface active moiety. In anionic surfactants, the moiety carries a negative charge as in soap. In cationic surfactants, the charge is positive. In non-ionic surfactants, there is no charge on the molecule, and in amphoteric surfactants, solubilization is provided by the presence of positive and negative charges linked together in the molecule. A zwitterion is a special category and is a molecule that exists as a dipolar ion rather than in the un-ionized form. The molecule is neutral overall but has a large charge separation like an amino acid. Zwitterions are also known as hybrid ions, and internal or intramolecular salts. In the case of amino acids, they are electrolytes having separated weakly acidic and weakly basic groups. For example, while shown as $H_2N-R-COOH$, in aqueous solution $\oplus H_3N-R-COO^-$ is the actual species where an internal proton transfer from the acidic carboxyl to the basic amino site is complete. The uncharged species has separate cationic and anionic sites but the positive and the negative ions are not free to migrate. Thus, it is a complex ion that is both positively and negatively charged. Alkyl betaines are also representative of zwitterions and are a special class of zwitterion where there is no hydrogen atom bonded to the cationic site. Some silicones are also zwitterions and it is this special category of silicone zwitterion to which the present invention relates.

The zwitterionomeric aminofunctional siloxane compositions of the present invention may be prepared in accordance with the following schematic:

pair of the zwitterionomer and the strong acid (HA). Formula (I) is generically described as an aminofunctional siloxane selected from the group consisting of reaction products of (A) a blend or reaction product of a hydroxyl endblocked polydimethylsiloxane having a viscosity in the range of about 10 to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiRNHCH_3CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical free of aliphatic unsaturation and contains three to four carbon atoms, (B) a blend or reaction product of a hydroxyl endblocked polydimethylsiloxane having a viscosity in the range of about 10 to 15,000 cs at twenty-five degrees centigrade, a silane selected from the group consisting of those having the general formulae $(R_1O)_3-SiR_2NHR_3$ and $(R_1O)_3-SiR_2NHCH_2CH_2NH_2$ wherein $R_1$ is an alkyl radical containing from one to four carbon atoms, $R_2$ is a divalent hydrocarbon radical free of aliphatic unsaturation and contains from three to four carbon atoms, and $R_3$ is selected from the group consisting of the hydrogen atom and the methyl radical, and a silane having the general formula $X_3SiZ$ wherein X is selected from the group consisting of alkoxy and acyloxy radicals containing from one to four carbon atoms, and Z is a nonhydrolyzable radical selected from the group consisting of hydrocarbon radicals, halogenated hydrocarbon radicals, and radicals composed of carbon, hydrogen, and oxygen atoms, wherein the oxygen atoms are present in hydroxyl groups, ester groups, or ether linkages, there being from one to ten carbon atoms in the Z radical, and (C) a blend or reaction product of a polydimethylsiloxane having a viscosity in the range of about one to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiRNHCH_2CH_2NH_2$ wherein $R'''$ is a hydrogen atom or a methyl radical, $R''$ is a monovalent hydrocarbon radical free of aliphatic unsaturation and contains from one to six carbon atoms, n has a value of from zero to two, $R'$ is an alkyl radical containing from one to four carbon atoms, and R is a divalent hydrocarbon radical

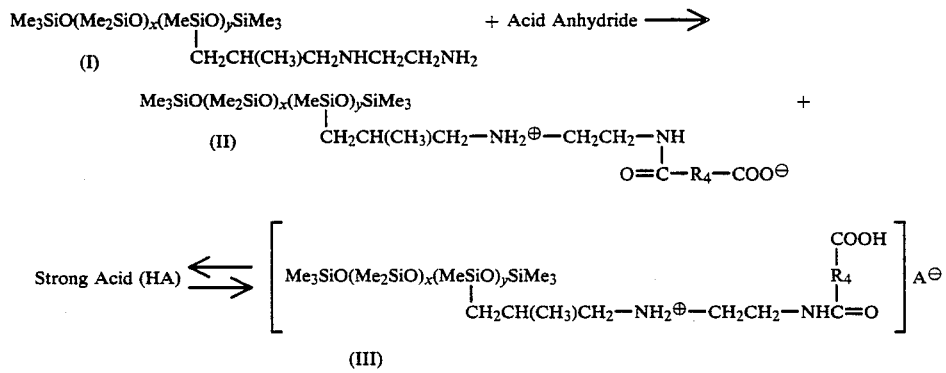

It should be noted in the above schematic that formula (I) denotes an aminofunctional siloxane, formula (II) denotes the zwitterionomer of the present invention, and formula (III) indicates the conjugate acid base free of aliphatic unsaturation and contains three to four carbon atoms. Such compositions are described in more or less detail in U.S. Pat. No. 3,508,933, issued Apr. 28, 1970, in U.S. Pat. No. 3,836,371, issued Sept. 17, 1974, and in U.S. Pat. No. 3,890,271, issued June 17, 1975. The preparation of these compositions and their use in polishes is also detailed in the aforementioned patents, the disclosures of which are incorporated herein by reference thereto. Particular of such compositions prepared and falling within the scope of the present invention is set forth in Table I.

TABLE I

| Compound (I) | x | y |
|---|---|---|
| A | 45.75 | 2.25 |
| B | 69.25 | 3.75 |
| C | 96 | 2 |
| D | 188 | 10 |
| E | 295.9 | 2.1 |
| F | 400 | 8 |

In the above schematic, the acid anhydride which is reacted with compositions of formula (I) is selected from the group consisting of succinic anhydride, maleic anhydride, phthalic anhydride, itaconic anhydride, or other cyclic anhydrides, and carbon dioxide, with the first named anhydride being the preferred material for use herein.

The resulting reaction product indicated by formula (II) in the foregoing schematic is an aminofunctional siloxane zwitterionomer having the structural formula:

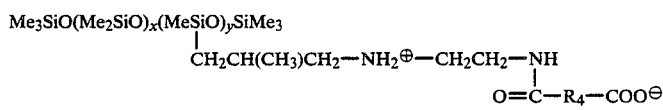

where Me is methyl, x is an integer of from about forty to about four hundred, y is an integer of from about one to about twenty, and $R_4$ is ethylene, vinylidene, or phenylene. x is preferably 188 and y is ten. The zwitterionic aminofunctional siloxane of formula (II) is further reacted with a strong acid (HA) resulting in an equilibrium of the zwitterion (II) and a conjugate acid base pair indicated by formula (III) of the zwitterion (II) and the acid (HA) which depends upon the pKa of the strong acid and the dielectric strength of the polish solvent. The strong acid (HA) is selected from the group consisting of hydrochloric, hydrobromic, hydriodic, nitric, perchloric, phosphoric, and organic acids, wherein the organic acid may be one of the group consisting of acetic, propionic, butyric, valeric, caproic, benzoic, halo-substituted benzoic, and nitro-substituted benzoic. The resulting formula (III) as shown above of the conjugate acid base pair of the zwitterion (II) and the strong acid (HA) has the structural formula:

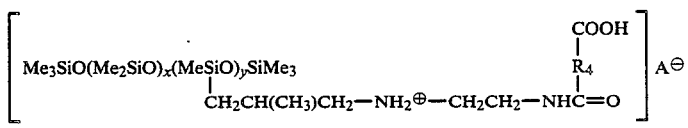

where again Me is methyl, x is a integer of from about forty to about four hundred, y is an integer of from about one to about twenty, A is an anion, and $R_4$ is ethylene, vinylidene, or phenylene. x is preferably 188 and y is ten. This is a specific embodiment of the present invention, and is not a requirement that the conjugate composition (III) be formed in every instance. However, it should be noted that where the conjugate (III) is formed, it necessitates the presence in the formulation of an acid. The equilibrium reached between the zwitterionomer (II) and the conjugate (III) depends on the strength of the acid. Where the acid is strong, the conjugate (III) predominates. Where the acid is weaker, the zwitterionomer predominates. As noted hereinbefore, such equilibrium depends upon the pKa of the strong acid and the dielectric strength of the solvent. Preferred solvents in accordance with the present invention are ethanol and toluene, for example.

The zwitterionic aminofunctional siloxane of formula (II) can also be further reacted with a basic compound resulting in an equilibrium of the zwitterion (II) and a conjugate acid base pair indicated by formula (IV) of the zwitterion (II) and the basic compound which depends upon the relative pKa's of the base B and the basic sites of the zwitterion, and the dielectric strength of the medium. The strong base is selected from the group consisting of organic amines, hydroxides, and lewis bases. The resulting formula (IV) as shown below of the conjugate acid base pair of the zwitterion (II) and the basic compound has the structural formula:

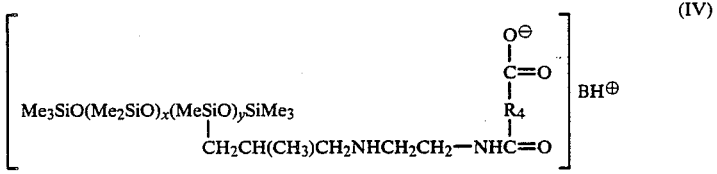

where again Me is methyl, x is an integer of from about forty to about four hundred, y is an integer of from about one to about twenty, BH is a cation and a protonated base, and $R_4$ is ethylene, vinylidene, or phenylene. x is preferably 188 and y is ten. This is a specific embodiment of the present invention, and is not a requirement that the conjugate composition (IV) be formed in every instance. However, it should be noted that where the conjugate (IV) is formed, it necessitates the presence in the formulation of a basic compound such as dibutyl amine. The equilibrium reached between the zwitterionomer (II) and the conjugate (IV) depends on the strength of the base. Where the base is strong, the conjugate (IV) predominates. Where the base is weaker, the zwitterionomer predominates. As noted hereinbefore, such equilibrium depends upon the relative pKa'3 s of the strong base and zwitterion, and the dielectric strength of the solvent.

The aminofunctional siloxanes of the formula (I) type may also be prepared by an alternate method from that set forth in U.S. Pat. No. 3,508,993, U.S. Pat. No. 3,836,371, and U.S. Pat. No. 3,890,271, aforementioned. In the alternate method, the starting material is methyldimethoxy ethylenediaminoisobutyl silane of the formula:

$CH_3(CH_3O)_2SiCH_2CH(CH_3)CH_2NHCH_2CH_2NH_2$

This aminofunctional silane is distilled to an active concentration of between about 95-99%. The silane is hydrolyzed with three moles of water added to one mole of the silane. The material is batch distilled at atmospheric pressure and at a temperature of about one hundred and thirty degrees centigrade. Methanol and residual water are then removed by vacuum stripping to yield an aminofunctional hydrolyzate. The aminofunctional hydrolyzate is added to a mixture of polydimethylsiloxane of viscosity of 1.5 centistokes, a dimethylcyclic of the formula $(Me_2SiO)_n$ where n is three, four, or five, and a catalyst such as potassium hydroxide or potassium silanolate. This mixture is equilibriated to a polymer by agitation and heat at about one hundred-fifty degrees centigrade. The mixture is cooled to about 80-90 degrees centigrade or lower and the catalyst is neutralized by the addition of acetic acid accompanied with mixing. The non-volatile content is increased by stripping of the volatiles under vacuum, followed by filtration of the material in a pre-coated plate and frame filter for the purpose of removing any haze in order to obtain a clarified product. A typical example of this procedure is set forth below.

EXAMPLE I

Into a round bottom flask was added 3,482,8 grams of a dimethylcyclic, 439.2 grams of hydrolyzate, 78.4 grams of polydimethylsiloxane of viscosity of 1.5 cs, and 38.3 grams of potassium silanolate catalyst. The contents of the flask were mixed under a nitrogen atmosphere for twenty minutes. Heat was applied to the flask and the contents were maintained at one hundred-fifty degrees centigrade for four hours. The mixtures was cooled to thirty-three degrees centigrade. The catalyst was neutralized by the addition to the flask of 2.14 grams of acetic acid. The fluid was stirred overnight and filtered. The resulting product was water clear and had a viscosity of 354 cs. The product contained five mol percent amine and was identified as the material set forth in Table I where x=188 and y=10.

EXAMPLE II

Example I was repeated in order to produce an aminofunctional siloxane of the formula (I) type. Zwitterionic aminofunctional siloxanes materials of the formula (II) type were obtained by separately dissolving succinic anhydride in dimethoxyethane in order to provide a ten weight percent solution of the anhydride. The succinic anhydride was added from a dropping funnel to the contents of the flask containing the formula (I) type aminofunctional siloxane, and the solution was heated with stirring at about fifty-five degrees centigrade and under a nitrogen flow. The mixture was vacuum distilled at about twenty millimeters of mercury or less under a nitrogen atmosphere at one hundred-twenty degrees centigrade for about forty-five minutes or until the vapor reached about eighty degrees centigrade, to remove all of the dimethoxyethane and yielding the zwitterionomer. The resulting zwitterionomer was distilled to a solids content of about eighty-eight percent. This example was repeated producing zwitterionomers having amine mol percentages ranging from about 0.5 mol percent to about eight mol percent.

The zwitterionic aminofunctional siloxanes of the present invention, were formulated into polishes in place of the aminofunctional siloxanes employed in U.S. Pat. Nos. 3,508,933, 3,836,371, and 3,890,271, causing water coming into contact with the surface treated, to sheet rather than to bead, as is conventional with prior art polish formulations. The polishes so formulated were applied both to actual vehicle surfaces as well as test panels. Water contacting the treated surfaces sheeted water and was noted by visual observation. Thus, prior art polishes lay down a film, but the film is a water beading film, in contrast to the water sheeting film obtained when the zwitterionomeric compositions of the present invention are employed. In either case, a film is formed by applying the polish to the surface to be treated and by rubbing in the polish onto the surface and allowing the solvent to evaporate, leaving behind the film. Inclusion of the zwitterionomers of the present invention, however, sheets the water, whereas omission beads the water. A distinct advantage of a water sheeting film is that, in contrast to a film that beads the water, the water sheeting film will not collect dust and debris following a rain as do water beading films, which necessitate that the surface be washed once more in order to remove the spots and rings caused by the water beading type of film. The water sheeting films of the present invention are of general application including such surfaces as motor vehicles, boats and navigable crafts, wood surfaces, plastic surfaces, and fiber surfaces. The films produce a high gloss, are durable, and are easy to apply.

It will be apparent from the foregoing that many other variations and modifications may be made in the structures, compounds, compositions, and methods described herein without departing substantially from the essential features and concepts of the present invention.

Accordingly, it should be clearly understood that the forms of the invention described herein are exemplary only and are not intended as limitations on the scope of the present invention.

That which is claimed is:

1. A method of sheeting water on a surface comprising applying to the surface before the surface is exposed to water a polish formulation containing as components thereof at least one member selected from the group consisting of waxes, solvents, surfactants, thickening agents, abrasives, dyes, odorants, and other ingredients normally used in making polishes, the polish formulation including therein a zwitterionometric composition which is the reaction product of an acid anhydride and an aminofunctional siloxane selected from the group consisting of (A) a combination of a hydroxyl endblocked polydimethylsiloxane having a viscosity in the range of about 10 to 15,000 cs at twenty-five degrees centigrade, and a silane selected from the group consisting of those having the general formulae $R'''_n(R'O)_{3-n}Si(CH_2)_3NHR'''$ and $R'''_n(R'O)_{3-n}SiRNHCH_2CH_2NH_2$ wherein $R'''$ is a hydrogen atom or a methyl radical, R" is a monovalent hydrocarbon radical free of aliphatic unsaturation and contains from one to six carbon atoms, n has a value of from zero to two, R' is an alkyl radical containing from one to four carbon atoms, and R is a divalent hydrocarbon radical free of aliphatic unsaturation and contains three to four carbon atoms, (B) a combination of a hydroxyl endblocked polydimethylsiloxane having a viscosity in the range of about 10 to 15,000 cs at twenty-five degrees centigrade, a silane selected from the group consisting of those having the general formulate $(R_1O)_3$—$SiR_2NHR_3$ and $(R_1O)_3$—$SiR_2NHCH_2CH_2NH_2$ wherein $R_1$ is an alkyl radical containing from one to four carbon atoms, $R_2$ is a divalent hydrocarbon radical free of aliphatic unsaturation and contains from three to four carbon atoms, and $R_3$ is selected from the group consisting of the hydrogen atom and the methyl radical, and a silane having the general formula $X_3SiZ$ wherein X is selected from the group consisting of alkoxy and acyloxy radicals containing from one to four carbon atoms, and Z is a nonhydrolyzable radical selected from the group consisting of hydrocarbon radicals, halogenated hydrocarbon radicals, and radicals composed of carbon, hydrogen, and oxygen atoms, wherein the oxygen atoms are present in hydroxyl groups, ester groups, or ether linkages, there being from one to ten carbon atoms in the Z radical, and (C) a combination of a polydimethylsiloxane having a viscosity in the range of about one to 15,000 cs at twenty-five degrees centigrade, and a silane selected from the group consisting of those having the general formulae $R''_n(R'O)_{3-n}Si(CH_2)_3NHR'''$ and $R''_n(R'O)_{3-n}SiR_nHCH_2CH_2NH_2$ wherein R''' is a hydrogen atom or a methyl radical, R" is a monovalent hydrocarbon radical free of aliphatic unsaturation and contains from one to six carbon atoms, n has a value of from zero to two, R' is an alkyl radical containing from one to four carbon atoms, and R is a divalent hydrocarbon radical free of aliphatic unsaturation and contains three to four carbon atoms.

2. The method of claim 1 wherein the acid anhydride is selected from the group consisting of succinic anhydride, maleic anhydride, phthalic anhydride, and carbon dioxide.

3. The method of claim 2 wherein the reaction product is an aminofunctional siloxane zwitterion having the structural formula:

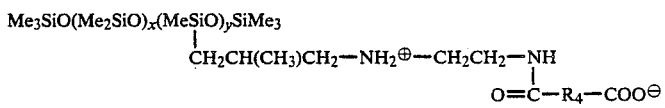

where Me is methyl, x is an integer of from about forty to about four hundred, y is an integer of from about one to about twenty, and $R_4$ is ethylene, vinylidene, or phenylene.

4. The method of claim 3 wherein x is preferably 188 and y is ten.

5. The method of claim 3 wherein the zwitterionic aminofunctional siloxane is further reacted with a strong acid resulting in an equilibrium of the zwitterion and a conjugate acid base pair of the zwitterion and the acid which depends upon the pKa of the strong acid and the dielectric strength of the solvent.

6. The method of claim 5 wherein the strong acid is selected from the group consisting of hydrochloric, hydrobromic, hydriodic, nitric, perchloric, phosphoric, and organic acids.

7. The method of claim 6 wherein the organic acid is selected from the group consisting of acetic, propionic, butyric, valeric, caproic, benzoic, halo-substituted benzoic, and nitro-substituted benzoic.

8. The method of claim 5 wherein the conjugate acid base pair of zwitterion and the strong acid has the structural formula:

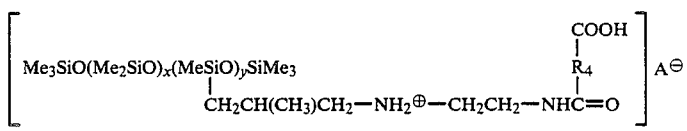

where Me is methyl, x is an integer of from about forty to about four hundred, y is an integer of from about one to about twenty, A is an anion, and $R_4$ is ethylene, vinylidene, or phenylene.

9. The method of claim 8 wherein x is preferably 188 and y is ten.